(12) United States Patent
Mesnage

(10) Patent No.: US 6,279,981 B1
(45) Date of Patent: Aug. 28, 2001

(54) REMOVABLE VEHICLE SEAT AND VEHICLE COMPRISING SUCH A SEAT

(75) Inventor: Stéphane Mesnage, Flers (FR)

(73) Assignee: Bertrand Faure Equipements SA, Boulogne (FR)

( * ) Notice: Subject to any disclaimer, the term of this patent is extended or adjusted under 35 U.S.C. 154(b) by 0 days.

(21) Appl. No.: 09/357,054

(22) Filed: Jul. 19, 1999

(30) Foreign Application Priority Data

Jul. 21, 1998 (FR) .................................................. 98 09282

(51) Int. Cl.[7] ........................................................ B60N 2/02
(52) U.S. Cl. ....................................... 296/65.03; 297/217.3
(58) Field of Search ....................... 296/65.03; 297/217.3, 297/344.1; 248/503.1; 340/310.01

(56) References Cited

U.S. PATENT DOCUMENTS

| | | | |
|---|---|---|---|
| 4,428,078 | * | 1/1984 | Kuo . |
| 4,763,360 | * | 8/1988 | Daniels et al. . |
| 5,330,245 | | 7/1994 | Boisett ................................ 296/65.1 |
| 5,443,239 | * | 8/1995 | Laporte . |
| 5,711,505 | * | 1/1998 | Nemoto . |
| 5,800,015 | * | 9/1998 | Tsuchiya et al. . |
| 5,803,491 | * | 9/1998 | Barnes et al. . |
| 5,820,216 | * | 10/1998 | Feuillet . |
| 5,890,779 | | 4/1999 | Blackburn et al. .................. 307/10.1 |
| 5,929,749 | * | 7/1999 | Slonim et al. . |
| 5,994,998 | * | 11/1999 | Fisher et al. . |
| 5,995,021 | * | 11/1999 | Kogure . |
| 6,050,835 | * | 4/2000 | Henrion et al. . |

FOREIGN PATENT DOCUMENTS

| | | |
|---|---|---|
| 29 05 235 | 12/1979 | (DE) . |
| 35 36 142 | 4/1987 | (DE) . |
| 197 43 313 | 3/1998 | (DE) . |
| 197 02 874 | 7/1998 | (DE) . |
| 198 14 670 | 10/1998 | (DE) . |
| 198 15 843 | 4/1999 | (DE) . |
| 0 546 908 A1 | 6/1993 | (EP) . |
| 0 558 408 A1 | 9/1993 | (EP) . |

OTHER PUBLICATIONS

German Search Report corresponding to German Appl. 199 33 835.3.

French Preliminary Search Report dated Mar. 29, 1999, Appl. No. FR 9809282.

* cited by examiner

Primary Examiner—Joseph D. Pape
Assistant Examiner—Scott Carpenter
(74) Attorney, Agent, or Firm—Marshall, O'Toole, Gerstein, Murray & Borun

(57) ABSTRACT

A removable automobile vehicle seat, comprising anchorings adapted to enable rapid mounting and dismantling of the seat on the bodywork of a vehicle. The seat comprises in addition an electrical circuit connected to an electrical supply connector which is connected to an electrical connector mounted on the vehicle bodywork, the connection and disconnection being made by the installing movement of the seat on the vehicle bodywork.

3 Claims, 3 Drawing Sheets

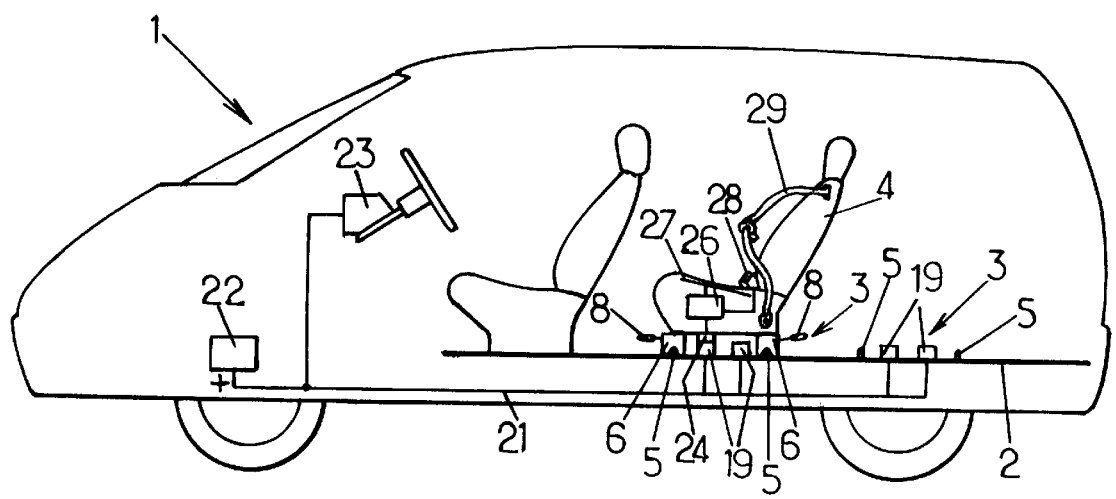
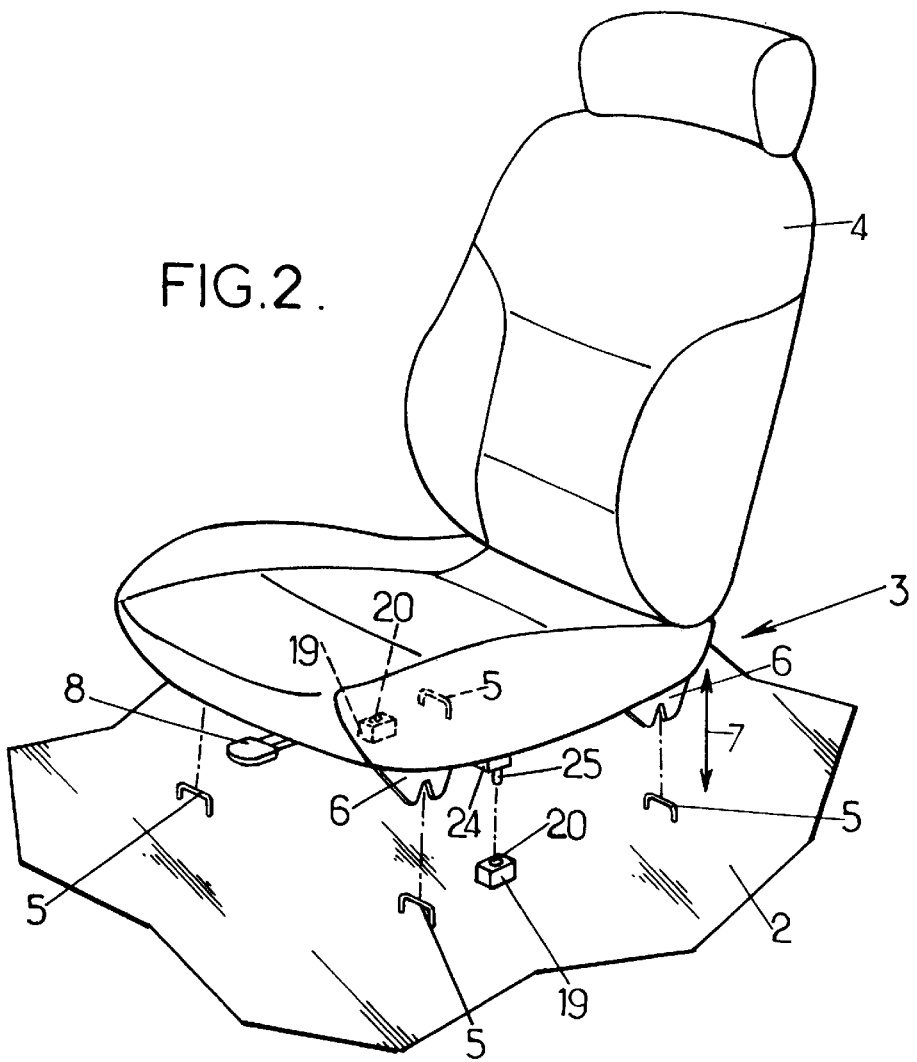

REMOVABLE VEHICLE SEAT AND VEHICLE COMPRISING SUCH A SEAT

FIELD OF THE INVENTION

The present invention relates to removable vehicle seats and to vehicles comprising such seats.

More particularly, the invention concerns an automobile vehicle removable seat, comprising anchorings adapted to enable rapid mounting and dismantling of the seat on the vehicle bodywork, by mounting and dismantling movements where at least one lower part belonging to the seat is moved along a pre-specified direction, the so-called mounting direction.

BACKGROUND OF THE INVENTION

The document EP-A-0 546 908 describes an example of such a seat, of the type of those used currently to constitute the rear seats of modular passenger compartment automobile vehicles.

These known seats do not include any electrical equipment, in order to avoid electrical connection and disconnection difficulties during the installation or removal of the seat by the user.

The result is that these removable seats are provided with fewer functionalities than fixed seats for automobile vehicles.

OBJECTS AND SUMMARY OF THE INVENTION

The particular object of the present invention is to ease these disadvantages.

To this end, according to the invention, a seat of the type in question is mainly characterized in that it comprises in addition at least one electrical circuit supplied with electrical current by means of a two terminal electrical connection device which is fixed on said lower part of the seat, this connection device being adapted:

- to be connected to an electrical connection device mounted on the vehicle bodywork, by mutual engagement in the mounting direction, due only to the mounting movement of the seat;
- and to disconnect from the connection device mounted on the bodywork, by only the dismantling movement of the seat in said mounting direction.

By means of these arrangements, the removable seat according to the invention can be provided with all the functionalities available on fixed electrical seats, without however the connection and disconnection of the electrical circuit of the seat requiring any additional operation whatever by the user during the mounting and dismantling of the seat.

In preferred embodiments of the seat according to the invention, resort can possibly be made to one and/or other of the following arrangements:

- the electrical circuit of the seat is adapted to interact with a central electronic processing unit carried by the vehicle, by modulation of the seat electrical current supply;
- the mounting direction is vertical.

Furthermore, the invention also has the object of an automobile vehicle comprising a bodywork on which is fixed at least one seat such as defined above, the vehicle bodywork including at least one connection device which is connected to the seat connection device by engagement in the mounting direction, and the vehicle comprising moreover a central electronic processing unit which is adapted to connect with the seat electrical circuit by modulation of the current supply.

In preferred embodiments of the vehicle according to the invention, resort can possibly be made moreover to one and/or other of the following arrangements:

- the vehicle bodywork comprises several connection devices, and the central electronic processing unit is adapted to recognize the connection device belonging to the bodywork, to which the seat connection device is connected;
- the vehicle bodywork comprises at least one location able to receive the removable seat positioned either frontward or backwards, the seat connection device being placed so as to be in two different positions relative to said location according to the positioning of the seat, and the vehicle bodywork comprising two connection devices corresponding respectively to said two possible positions of the seat connection device;
- the bodywork comprises at least one slide able to receive the removable seat enabling it to slide, this slide comprising at least one movable component which is adapted to follow the sliding movement of the seat and which carries the connection device belonging to the bodywork.

BRIEF DESCRIPTION OF THE DRAWINGS

Other characteristics and advantages of the invention will emerge during the following description according to two of its embodiments, given as non-restrictive examples, compared with the appended drawings.

FIG. 1 is a diagrammatic view of an automobile vehicle comprising at least one removable seat according to the invention, FIG. 2 is an exploded detail view of a seat assembly according to a first embodiment of the invention, usable in the vehicle of FIG. 1.

MORE DETAILED DESCRIPTION

Figure 3:
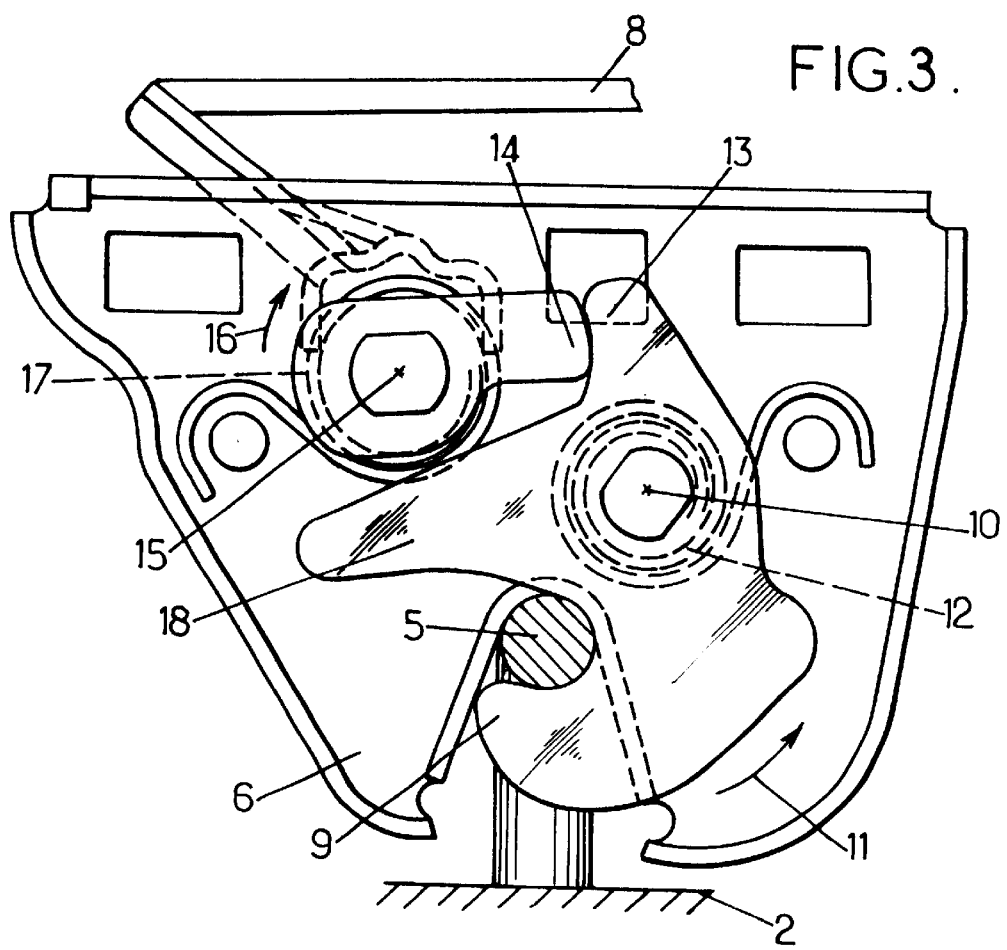
FIG. 3 is detail view of one of the rear feet of the seat of FIG. 2.

In the different figures, the same references designate identical or similar components.

FIG. 1 shows a modular compartment automobile vehicle 1. The floor 2 belonging to the bodywork of this vehicle comprises several locations 3 each able to receive a removable seat 4 positioned either frontward or backwards.

As shown in FIG. 2, each seat location 3 of the floor 2 includes, in the first embodiment of the invention, four metal rings 5 or other anchoring parts, in which can be engaged four metal feet 6 belonging to the seat Each of the feet 6 has an open downwards fork shape so that the mounting of the seat 4 on the floor 2 is made by vertical engagement of the feet 6 on the rings 5, in the direction of the arrow 7.

During the vertical engagement of the seat 4 on the rings 5, the feet 6 are in addition locked on the rings 5, and said feet can be unlocked from the rings 5 by means of two handles 8 which control respectively the unlocking of the two front feet and the two rear feet.

A particular example of the locking system usable for the feet 6 is shown in FIG. 3 as a non-restrictive example, other locking systems being known professionally. In this particular example, each foot 6 comprises a hook shaped lock which is pivoting mounted on said foot 6 around a horizontal transverse axis 10.

The lock 9 can be rotated between:
  on the one hand, a locking position, shown in FIG. 3, where the lock 9 is engaged under the ring 5 to anchor the seat on the vehicle floor,
  and on the other hand, an unlocking position (not shown) where said lock 9 pivots in the direction of the arrow 11 so as not to be engaged under the ring 5

The lock 5 is resiliently acted on by a spring 12 towards its unlocking position, and it is normally held in its unlocking position by a cam stop 13 of said lock against the free end of a control peg 14 which extends approximately radially from a transverse horizontal pivoting axis 15 and which is fixed with the corresponding handle 8.

The control peg 14 and the handle 8 are resiliently acted upon by a spring 16 in the direction of the arrow 17, so that the control peg 14 is normally held in a neutral position where it engages with the cam 13 to hold the lock 9 in its locking position.

When a user lifts the handle 8, he pivots the control peg 14 in the opposite direction to the arrow 16, so that the cam 13 can pass under the control peg 14 enabling the lock 9 to pass into its unlocking position.

After unlocking the foot 6, the cam 13 stays engaged under the control peg 14 and a nose 18 belonging to the lock 9 slightly lifts the foot 6 by pressing on the corresponding ring 5.

When it is then wished to refasten the removable seat on the vehicle floor 2, the feet 6 are engaged vertically in the rings 5, so that said rings lift the noses 18 of the locks 9 by passing said locks into their locking position. Each control peg 14 can then return into its neutral position under the action of its spring 17, to then hold the corresponding lock 9 in its locking position shown in FIG. 3.

Furthermore, as shown in FIGS. 1 and 2, the vehicle floor 2 comprises, at each seat location 3, two electrical connectors 19, in this case female connectors, which each include a single contact point 20.

The different fixed connectors 19 of the vehicle floor are connected to a supply cable 21 itself connected to the positive terminal of a battery 22 or other electrical supply source, the negative terminal of this battery able to be for example connected to the ground, i.e. the vehicle bodywork.

The electrical supply cable 21 is furthermore connected to an electronic control circuit 23 placed for example in the vehicle dashboard, which control circuit is adapted to modulate the electrical current or carrier current flowing in the supply cable 21 in order to transmit data to the connectors 19 or in order to receive data from these connectors. This modulation is preferably carried out by using the known spread spectrum technique.

Preferably, each of the connectors 19 can include an electronic identification card which can interact with the control circuit 23, so that the supply cable 21 functions as a data bus.

As a variant, the vehicle could comprise a supply cable for each connector 19, in which case said connectors 19 would no longer need to comprise electronic identification cards.

Furthermore, the removable seat 4 comprises, under its lower face, a male supply connector 24 which includes a pin 25 adapted to penetrate vertically into the female contact 20 of one of the fixed connectors 19, during the seat installation movement.

The connector 24 of the removable seat 4 is placed so as to be in a different place to the location 3 of the removable seat according to whether the seat 4 is positioned frontward or backwards, the location 3 of the seat comprising two fixed connectors 19 placed in the space where the supply connector 24 of the seat is located following the seat being positioned frontward or rearwards Thus, by locating which fixed connectors 19 supply a seat electrical circuit 26, the control circuit 23 of the vehicle can not only know the seat locations 3 which are effectively occupied by removable seats, but also know the position of said seats.

The electrical circuit 26 of the removable seat 4 can serve to carry out various functionalities in the seat 4, for example motorized adjustment of various parts of this seat.

In the particular example shown in FIG. 1, the electrical circuit 26 enables a heater mat 27 integrated in the seat part to be supplied, and said electrical circuit 26 is also connected to a sensor 28 enabling to be known if the seat belt 29 of the seat 4 is attached or not, in order to retransmit this data to the driver of the vehicle by means of the electrical control circuit 23.

Furthermore, in the particular example considered here, the positive supply terminal of the electrical circuit 26 is constituted by the connector 24, whereas the negative supply terminal of said circuit 26 is connected to the metal frame of the seat 4, itself connected to the ground (vehicle bodywork) by means of the feet 6 and the rings 5: each seat 4 comprises therefore a connection device which includes the connector 24 and the feet 6, this connection device engaging with a fixed connection device which includes the connector 19 corresponding to the connector 24 and the rings 5.

In every case, the seat control device includes therefore only two terminals + and −, the − terminal for example constituted by one or several feet 6.

Figure 4:
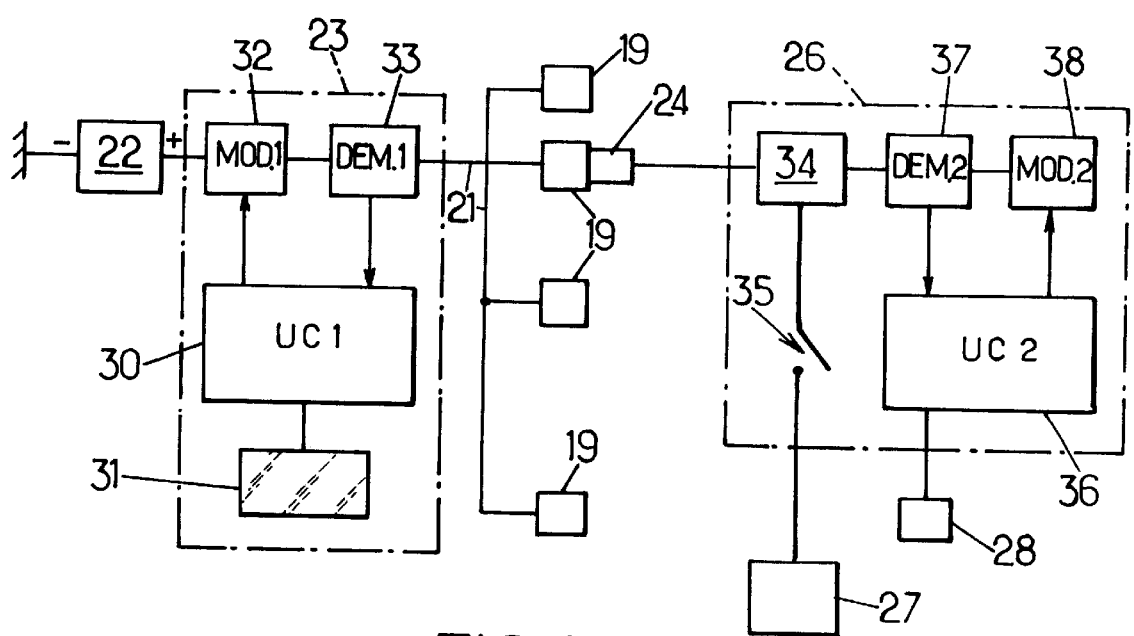
FIG. 4 is a block diagram showing the electrical circuits of the vehicle and of the removable seat.

In FIG. 4, an embodiment of the control circuit 23 and of the seat electrical circuit 26 has been shown diagrammatically, without showing the electrical connections to the positive and negative supply terminals of the different parts of the circuits, in order to not overload the drawing.

In this embodiment, the electrical control circuit 23 includes:
  a central electronic processing unit 30 (UC1) consisting for example of a microprocessor connected to a memory,
  a screen 31 integrated in the vehicle dashboard controlled by the central processing unit 30,
  a modulator 32 (MOD. 1) connected to the supply cable 21 and to the central processing unit 30 to enable the central unit 30 to send data to the electrical circuits 26 of the removable seats and to the connectors 9,
  and a demodulator 33 (DEM. 1) connected to the cable 21 and to the central processing unit 30 to receive data from the electrical circuits 26 of the seats and from the connectors 19.

Furthermore, the electrical circuit 26 of the seat includes:
  a supply circuit 34, which is connected to the connector 24 and which in the example considered is also connected to the heater mat 27 by means of a manual switch 35,
  a central electronic processing unit 36 (UC2) connected in particular to the sensor 28, the central processing unit 36 being able to include for example a microprocessor connected if the need arises to a memory, a demodulator 37 (DEM. 2) which is connected to the connector 24 and to the central processing unit 36 to enable this central processing unit to receive data coming from the vehicle control circuit 23, and a modulator 38 (MOD. 2) which is connected to the connector 24 as well as to the central processing unit 36 to enable this central processing unit to send data to the control circuit 23.

Figure 5:
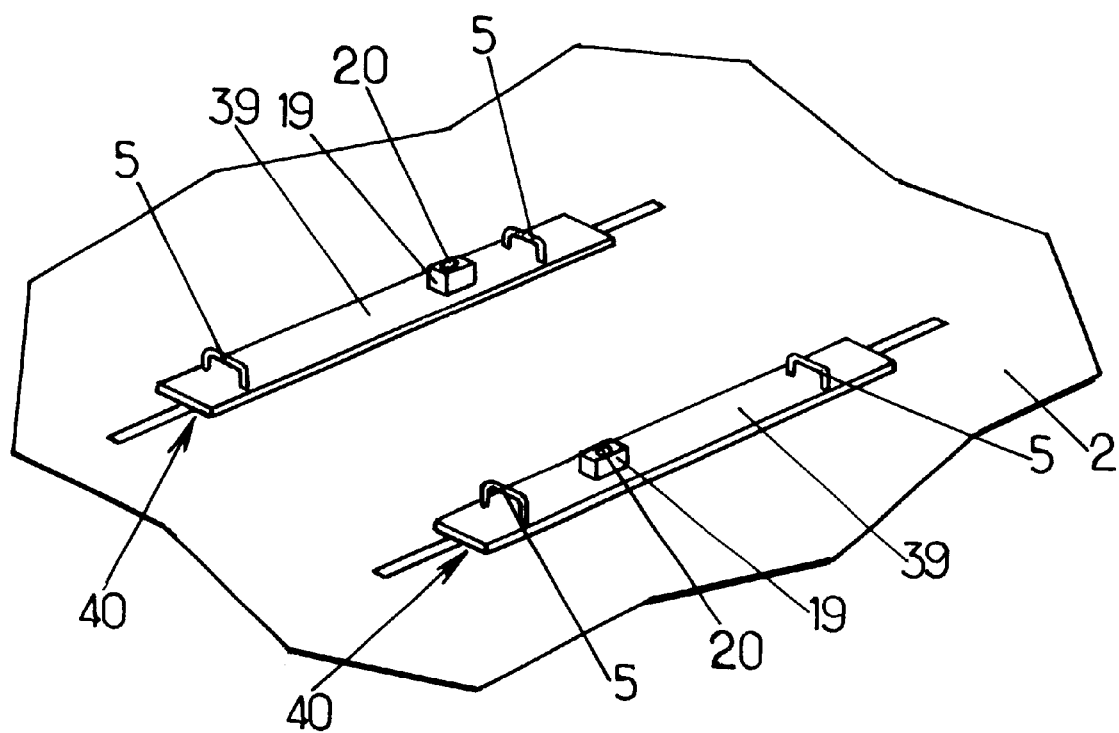
FIG. 5 is a perspective diagrammatic view showing the vehicle floor in a second embodiment of the invention where the removable seat is identical or similar to the seat of FIGS. 2 to 4.

The second embodiment of the invention, shown very diagrammatically in FIG. 5, is only distinguished from the first embodiment described above by the fact that the rings 5 and the connectors 19 are mounted on the movable sections 39 of two slides 40 which are adapted to enable an adjustment of the longitudinal position of the removable seat 4, these slides being able to be locked in position, for example by means of slide locks (not shown) carried by the feet of the removable seat 4.

What is claimed is:

1. An automobile vehicle comprising a bodywork on which is fixed at least one removable seat comprising anchorings adapted to enable rapid mounting and dismantling of the seat on said bodywork, by mounting and dismantling movements where at least one lower part belonging to the seat is moved along a pre-specified direction, so called mounting direction, said seat further comprising at least one electrical circuit supplied with electrical current by means of an electrical seat connection device which is fixed on said lower part of the seat, said bodywork comprising at least one location able to receive the removable seat positioned either in a frontward direction or in a rearward direction, the seat connection device being arranged to be in two different positions relative to said location according to the direction of the seat, and said location comprising first and second bodywork connection devices which are connected to the seat connection device respectively in said frontward and rearward directions of the seat, said seat connection device being adapted:

to connect to one of said bodywork connection devices by mutual engagement in the mounting direction, due only to the mounting movement of the seat, and to disconnect from the bodywork connection device, by only the dismantling movement of the seat in said mounting direction, said vehicle further comprising a central electronic processing unit which is adapted to communicate with the electrical circuit of the seat by modulation of the supply current, said central electronic processing unit being adapted to recognize the direction of the seat on said location by recognizing the bodywork connection device.

2. An automobile vehicle according to claim 1 wherein the mounting direction is vertical.

3. An automobile vehicle according to claim 1, wherein the bodywork comprises at least one slide able to receive the removable seat enabling it to slide, this slide comprising at least one movable component which is adapted to follow the sliding movement of the seat and which carries the connection device belonging to the bodywork.

* * * * *